United States Patent [19]
Martin et al.

[11] Patent Number: 5,384,774
[45] Date of Patent: Jan. 24, 1995

[54] ASYNCHRONOUS TRANSFER MODE (ATM) PAYLOAD SYNCHRONIZER

[75] Inventors: Gary D. Martin, North Andover, Mass.; Hiromi Ueda, Yokohama, Japan

[73] Assignee: AT&T Corp., Murray Hill, N.J.

[21] Appl. No.: 2,576

[22] Filed: Jan. 11, 1993

[51] Int. Cl.⁶ .......................................... H04L 7/00
[52] U.S. Cl. ................................... 370/82; 370/102; 370/108
[58] Field of Search ................ 370/84, 100.1, 102, 370/108; 375/106, 112, 118

[56] References Cited

U.S. PATENT DOCUMENTS

| | | | |
|---|---|---|---|
| 4,688,215 | 8/1987 | Fryer | 370/102 |
| 4,807,221 | 2/1989 | Stummer | 370/102 |
| 4,833,673 | 5/1989 | Chao et al. | 370/102 |
| 5,131,012 | 7/1992 | Dravida | 375/108 |
| 5,214,643 | 5/1993 | Mueller et al. | 370/84 |
| 5,274,680 | 12/1993 | Sorton et al. | 375/112 |

OTHER PUBLICATIONS

CCITT Recommendation I.432, "B-ISDN User-Network Interface-Physical Layer Specification", Geneva 1991.
CCITT Recommendation G.708, "Network Node Interface for the Synchronous Digital Hierarchy", Melbourne 1988.
CCITT Recommendation G.709, "Fascicle III.4–Rec. G.709", Melbourne 1988.
CCITT Recommendation I.361 (revised), "B-ISDN ATM Layer Specification" Jul. 1992.

Primary Examiner—Benedict V. Safourek
Attorney, Agent, or Firm—Thomas Stafford

[57] ABSTRACT

The requirement of a separate payload clock in an ATM system is eliminated by increasing the number of bytes in an ATM cell and controllably generating and inserting idle cells so that a clock rate equal to that of the incoming SDH, SONET or the like clock rate may be used as a read clock. In one embodiment, the number of cells in a predetermined interval, for example 125 μsec., is adjusted to be a predetermined integer number by inserting idle cells. This, in turn, allows the use of a "standard" available clock to delineate cell boundaries.

7 Claims, 3 Drawing Sheets

ASYNCHRONOUS TRANSFER MODE (ATM) PAYLOAD SYNCHRONIZER

CROSS-REFERENCE TO RELATED APPLICATION

U.S. patent applications Ser. Nos. 08/002,575 and 08/002,577 were filed concurrently herewith.

1. Technical Field

This invention relates to digital transmission systems and, more particularly, to convening an ATM payload from a synchronous digital signal to a so-called synchronous "ATM" signal.

2. Background of the Invention

In synchronous digital transmission systems employing, for example, either a Synchronous Digital Hierarchy (SDH) signal or a SONET signal it is usually required to obtain the payload data, which typically would require the use of a so-called "payload clock". Such a payload clock is usually not available in most digital transmission equipment and, consequently, it would have to be generated using a separate clock arrangement. This is undesirable because of the complexity and the expense attributed to it.

It is noted that ATM transmission of data is on a cell-by-cell basis wherein each cell comprises a predetermined number of bytes for transporting a fixed length packet. Thus, in the ATM context, the term cell and packet are interchangeable.

SUMMARY OF THE INVENTION

The requirement of a separate payload clock in an ATM system is eliminated, in accordance with the principles of the invention, by increasing the number of bytes in an ATM cell and controllably generating and inserting idle cells into an ATM cell stream so that a clock rate equal to that of the incoming SDH, SONET or the like clock rate may be used as a read clock.

In one embodiment, the number of cells in a predetermined interval, for example 125 μsec., is adjusted to be a predetermined integer number by inserting idle cells. This, in turn, allows the use of a "standard" available clock to delineate cell boundaries.

Technical advantages of the invention are the elimination of the need to use a non-standard payload clock and a non-standard cell boundary reference.

DETAILED DESCRIPTION

Figure 1:
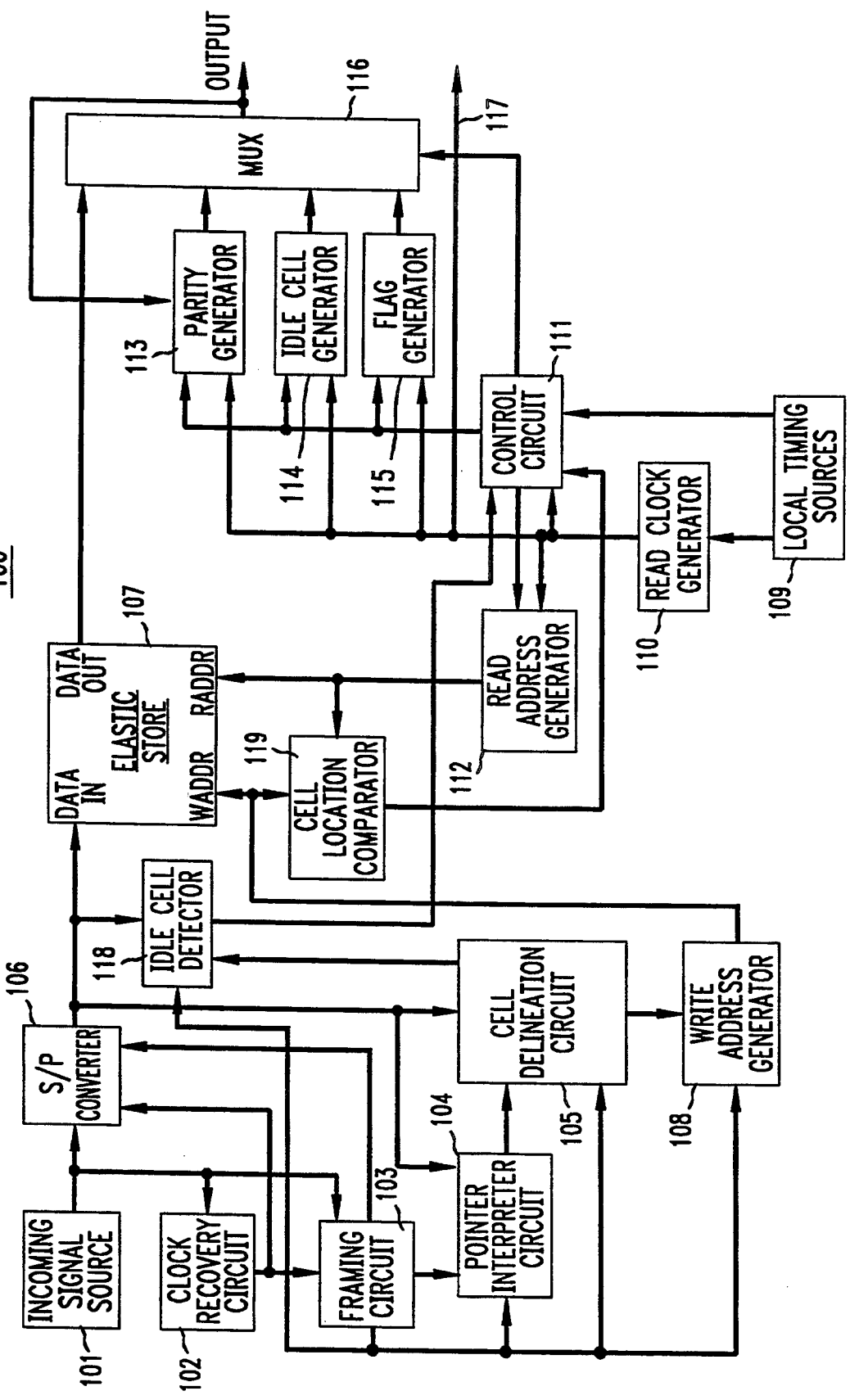
FIG. 1, shows in simplified block diagram form, an ATM payload synchronizer, including an embodiment of the invention.

FIG. 1 shows a digital ATM payload synchronizer 100 including an embodiment of the invention. Specifically, a digital transmission signal to be synchronized to a local output clock signal is supplied from incoming signal source 101 to clock recovery circuit 102, framing circuit 103 and serial-to-parallel (S/P) converter 106. The incoming digital signal may be any one of a number of digital transmission signals transporting ATM cells in its payload portion. For example, the digital transmission signal could be a digital synchronous hierarchy (SDH) digital signal or a SONET digital signal. In this example, it is assumed that the ATM cells are being transported in an STM-1 SDH signal having a line rate of 155.52 Mb/s. In this example, the ATM data cells are written into and read out of elastic store 107 on a bytewise basis. Thus, write address generator 108 would generate write addresses at a sub-multiple of the incoming clock rate.

Clock recovery circuit 102 recovers the incoming STM-1 clock rate in known fashion from the incoming signal. The recovered clock is supplied to framing circuit 103 and S/P converter 106. Framing circuit 103 is responsive to the recovered clock and to the incoming signal. It determines byte boundaries and the location of STM-1 section overhead (SOH) bytes, in well known fashion. Framing circuit 103 controls S/P converter 106 so that it presents data to elastic store 107, pointer interpreter circuit 104, cell delineation circuit 105 and idle cell detector 118 a byte at a time with correct byte boundaries. Framing circuit 103 also provides a "byte clock" at one-eighth (⅛th) the recovered STM-1 clock rate to pointer interpreter circuit 104, cell delineation circuit 105, write address generator 108 and idle cell detector 118. It also provides control signals to pointer interpreter circuit 104 indicating the location of the section overhead bytes and the pointer bytes, i.e., H bytes.

The operation of pointer interpreter circuit 104 is defined in CCITT Recommendation G.709. It determines the location of path overhead (POH) in the STM-1 payload envelope. It is noted that the POH location in the STM-1 payload envelope is not in a fixed position relative to the location of the SOH.

Pointer interpreter 104 supplies an indication to cell delineation circuit 105 of whether or not the current output byte from S/P converter 106 is a payload byte (i.e., a byte from an ATM cell). Note that negative justifications are considered payload bytes because they carry valid data.

Cell delineation circuit 105 is operative to identify the ATM cell boundaries in the incoming STM-1 payload envelope. Note that a standard ATM cell is defined in CCITT Recommendation I.361 The cell delineation is realized by employing a header error control (HEC) field in each ATM cell header. The HEC field transports an eight (8) bit control word which is generated by using a shortened cyclic code with a predetermined generating polynomial, namely: $x^8+x^2+x+1$. Then, the cell delineation is performed by using a correlation between the ATM cell header bits to be protected (32 bits) and the noted control bits in the HEC field.

Figure 3:
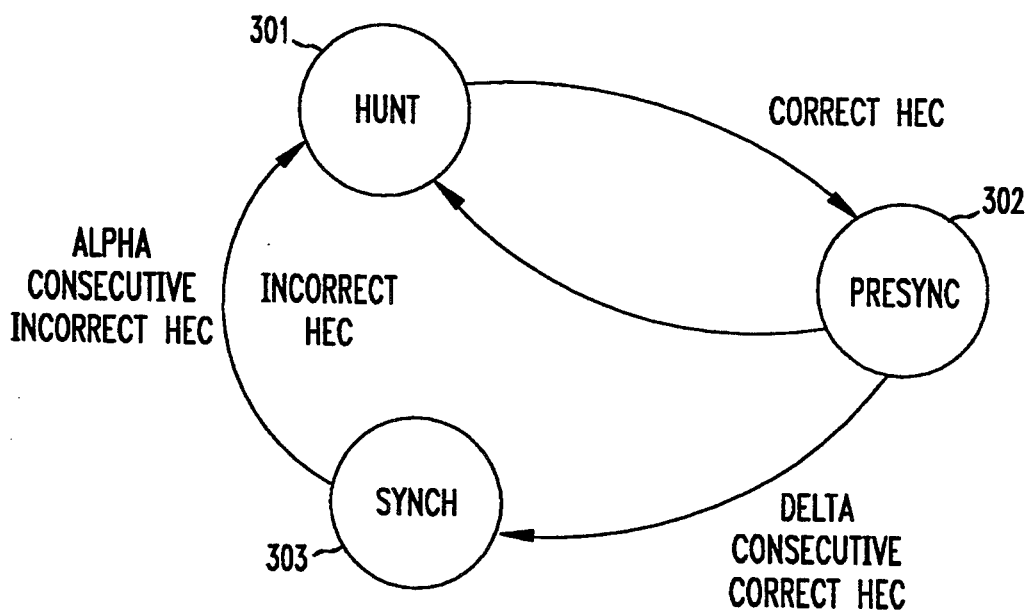
FIG. 3 shows a STATE diagram illustrating operation of the cell delineation circuit of FIG. 1.

FIG. 3 shows a state diagram of the HEC cell delineation method. Again, it is noted that the delineation is done on a cell by cell basis. The details of the state diagram of FIG. 3 are described as follows:

1. In the HUNT state 301 the delineation process is performed by checking whether the HEC coding law is respected (i.e., syndrome=0) for the assumed header field. Once such an agreement is found, it is assumed that one header has been found and the method enters the PRESYNCH state 302.

2. The process repeats until the HEC coding law has been confirmed as being detected DELTA consecutive occurrences.

3. Once DELTA consecutive occurrences of the HEC coding law have been confirmed, the process enters SYNCH state 303. In SYNCH state 303 the cell delineation will be assumed to be lost if the HEC coding law is incorrectly recognized ALPHA consecutive times.

The parameters ALPHA and DELTA have to be chosen to make the cell delineation process as robust and secure as possible and to meet prescribed performance parameters which are left to the implementer. In one example, ALPHA is chosen to be seven (7) and DELTA is chosen to be six (6).

Cell delineation circuit 105 generates signals indicating the beginning of each received cell and supplies such indication to write address generator 108. Cell delineation circuit 105 is also operative to control write address generator 108 so that the STM-1 section overhead and the path overhead (POH) are not written into elastic store 107, as well as, any positive justification bytes. Details and operation of cell delineation circuit 105 are described in CCITT Recommendation I.432.

Elastic store 107, in this example, has storage capacity for at least two ATM cells. However, it will be apparent to the implementor that if a different SDH digital signal or a particular SONET digital signal is employed, the capacity of elastic store may have to be adjusted accordingly. It is noted that an ATM cell includes 53 bytes for transporting a fixed length packet. As indicated above, the ATM cell data is written into elastic store 107 on a byte-wise basis. It is further noted that the write addresses supplied to the write address (WADDR) input of elastic store 107 are such to control the writing of the first byte of an ATM cell into one of a plurality of fixed known locations and the remaining bytes of the particular ATM cell are in sequential locations relative to that location in which the first byte has been written. It is important to employ these known specific fixed locations for the first byte of the ATM cells so that when the bytes of the ATM cell are being read out of elastic store 107, it is known which byte of the cell is being read by the address of the memory location.

Figure 2:
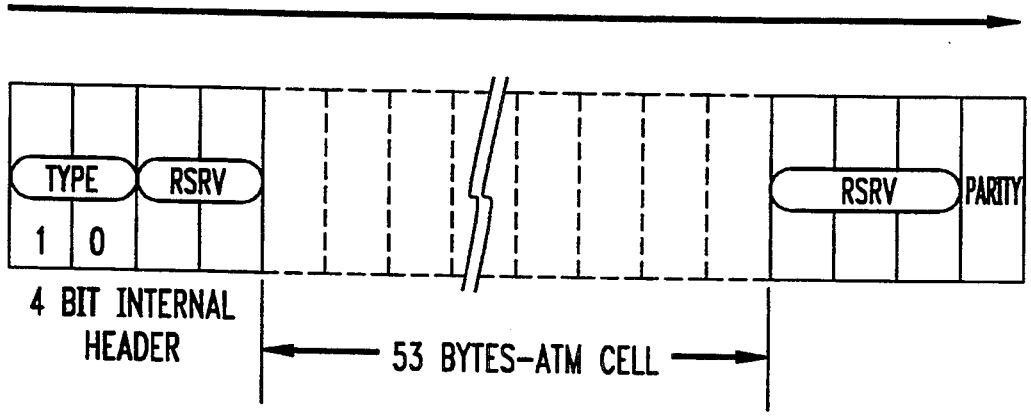
FIG. 2 shows an internal ATM cell format useful in describing the invention.

As indicated above, it is desirable to read the ATM cell bytes out of elastic store 107 employing a local clock which is at a so-called "synchronous" ATM rate that is the same as the clock rate of the incoming STM-1 digital signal in accordance with the principles of the invention. This, in turn, eliminates the need for the generation of a non-standard payload clock in order to read out the ATM cells in the STM-1 payload envelope. To this end, local timing sources 109 supply prescribed standard clock signals to read clock generator 110 and control circuit 111. Read clock generator 110 then generates the so-called "synchronous" ATM read clock having, in this example, the STM-1 rate of 155.52 Mb/s. Note that since the ATM cell data is read from elastic store 107 on a byte-wise basis, the actual read clock is a sub-multiple (i.e., ⅛th) of the STM-1 clock. The read clock is generated, in this example, in response to a standard 8 KHz clock which is employed as a cell boundary reference for the internal 54 byte cell format. The internal 54 byte ATM cell format is shown in FIG. 2 and described below. Consequently, the need for a non-standard cell boundary reference is eliminated. The read clock from read clock generator 110 is supplied to control circuit 111, read address generator 112, parity generator 113, idle cell generator 114 and flag generator 115. The read clock is also supplied as an output via 117.

Control signals are supplied from control circuit to read address generator 112, parity generator 113, idle cell generator 114, flag generator 115 and multiplexer (MUX) 116.

Read address generator 112 is responsive to the output of read clock generator 110 and control signals from control circuit 111 to generate read addresses RADDR which are supplied to elastic store 107 and cell location comparator 119.

Idle cell detector 118 is employed to detect idle cells as they are written into elastic store 107 and supplies an indication of such detected idle cells to control circuit 111. To this end, idle cell detector 118 makes a determination, based on the contents of the header of each cell, whether each cell is an idle cell or not. This is achieved in known fashion by comparing the received cell header to an expected idle cell pattern. For example, an ATM idle cell has a distinct header pattern as defined in CCITT Recommendation I.361, entitled "B-ISDN ATM Layer Specification". Thus, idle cell detector 118 supplies an indication to control circuit 111 as to whether or not cells stored in elastic store 107 are idle or not, which is used for purposes to be described below.

Cell location comparator 119 is employed to compare the current write location being written via WADDR from write address generator 108 and the current read location being read via RADDR from read address generator 112 to generate a so-called "full cell store indication" which is supplied to control circuit 111. This is realized by determining if a full ATM cell (53 bytes) is stored in the next subsequent cell storage location relative to the current ATM cell being read out of elastic store 107.

Parity generator 113 is operative in response to control signals from control circuit 111 to generate parity over the 54 byte internal cell format being supplied as an output from MUX 116, in accordance with the invention. It is also operative to add the a second nibble of 54th byte to each 53 byte ATM cell being read from elastic store 107 or an internal idle cell being read from idle cell generator 114. To this end, 4 bits, i.e., the second nibble, are added to the end of the standard 53 byte ATM cell being read from elastic store 107 or an internal idle cell being read from idle cell generator 114. As indicated below, flag generator 115 adds 4 bits, i.e., a first nibble, to the beginning of each 53 byte ATM cell. The first nibble added to the beginning of the 53 byte ATM cell includes a unique cell type indicator which occupies 2 of the 4 bits and the other two (2) bits being reserved (RSRV) for future use. The second nibble added to the end of the 53 byte ATM cell includes the parity bit position and three (3) additional bits positions that reserved (RSRV) for future use. Note that the second nibble of a current cell being read out of the elastic store 107 or idle cell generator 114 and the first nibble on the next cell to be outputted form a single byte. It is noted that parity is generated over all the bits in the entire 54 byte ATM cell being supplied as an output from MUX 116 including the parity bit position. In this example, odd parity is employed, however, even parity could equally be employed and is left to the implementor. The first and second nibbles are added to the ATM cell being read from elastic store 107 or idle cell generator 114 via MUX 116 under control of control circuit 111. The cell being supplied as an output from MUX 116 is the 54 byte ATM cell shown in FIG. 2.

Idle cell generator 114 generates an internal 53 byte idle cell to which the first and second nibbles are added under control of control circuit 111, as described above.

Flag generator 115 under control of control circuit 111 adds the first nibble to the beginning of the 53 byte ATM cells and also generates the information to be inserted into the type bit positions (T1 and T2) in the first nibble in the 54 byte internal ATM cell format shown in FIG. 2. T1 indicates whether a cell is idle or not. In this example, T1=1, indicates a non-idle cell and T1=0 indicates an idle cell. T0 indicates the origin of the cell. In this example, T0=1, indicates an external originated cell and T0=0, indicates an internal originated cell. Use of the type bits greatly simplifies the detection of idle cells in the internal ATM cell format, in accordance with the invention.

Control circuit 111 is operative to generate a predetermined integral number of cell intervals per a prescribed interval, for example, a 125 μsec. interval. Thus, in this example, the number of 54 byte internal ATM cells is increased to 45 per 125 μsec. interval by adding 54 byte internal ATM idle cells at appropriate instances. Increasing the ATM cell size to 54 bytes, along with increasing the number of 54 byte cells to the predetermined integer number during the 125 μsec. interval, increases the read clock rate to the desired 155.52 Mb/s per second. In order to increase the number of cells to 45 every 125 μsec. interval, an internal idle cell is generated and inserted via MUX 116 under control of control circuit 111 on the average after every 52, 54 byte ATM cells have been outputted. Thus, control circuit 111 determines at the end of each previous cell interval, whether or not to control MUX 116 to output bytes of an ATM cell from elastic store 107, adding the first nibble at the beginning of the 53 byte cell being read and the second nibble at the end, inserting the type information of the cell via flag generator 115 in the appropriate bits of the first nibble, causing parity generator 113 to begin generating parity for the next cell being read from elastic store 107 and to add the parity bit in the last bit position of the second nibble being added to the 53 byte ATM cell being read from elastic store 107. The insertion of a 54 byte ATM idle cell via idle cell generator 114, parity generator 113, flag generator 115 and MUX 116 is effected under control of control circuit 111 in response to the indication from cell location comparator 119 of whether or not a full cell is stored in the next subsequent storage locations in elastic store 107 relative to the storage locations of the current cell being read out.

Figure 4:
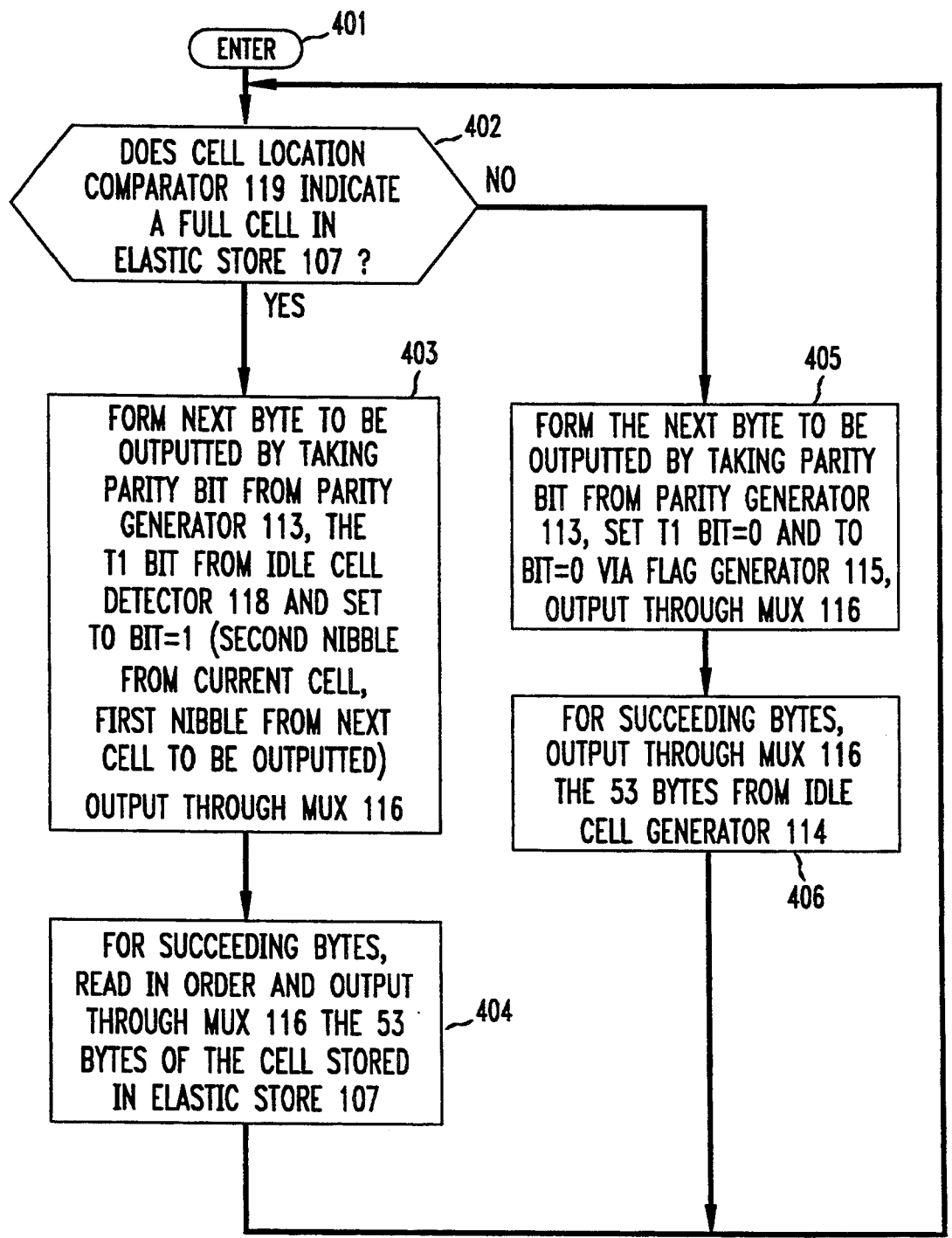
FIG. 4 is a flow chart illustrating the operation of the control circuit of FIG. 1.

Operation of control circuit 111 is summarized in the flow chart of FIG. 4. Specifically, the procedure is entered via step 401. Thereafter step 402 determines whether or not there is a full cell in elastic store 107. If the test result in step 401 is YES, step 403 causes formation of a next byte to be outputted via MUX 116 by including the second nibble of the current cell being outputted with the first nibble of the next cell to be outputted and to output the formed byte through MUX 116. The second nibble is generated, as described above, by parity generator 113 and the first nibble is generated, as described above, via flag generator 115. Note that type bit T1 is obtained from idle cell detector 118 and type bit T0 is set to 1 indicating an external cell. Then, step 404 causes the succeeding 53 bytes to be read from elastic store 107. Thereafter, control is passed to step 402. If the test result in step 402 is NO, step 405 causes formation of a next byte to be outputted via MUX 116 by including the second nibble of the current cell being outputted with the first nibble of the next cell to be outputted and to output the formed byte through MUX 116. The second nibble is generated, as described above, by parity generator 113 and the first nibble is generated, as described above, via flag generator 115. Note that type bit T1 is set to 0 and type bit T0 is set to 1 indicating an internal idle cell. Then, step 406 causes the succeeding 53 bytes to be read from idle cell generator 114. Thereafter, control is passed to step 402.

The above-identified arrangements are, of course, merely illustrative of the application of the principles of the invention. Other arrangements may be devised by those skilled in the art without departing from the spirit or scope of the invention. For example, in certain applications it may be desirable and/or advantageous to derive the read clock from the recovered clock of an incoming SDH, SONET or the like clock.

We claim:

1. An asynchronous transfer mode (ATM) payload synchronizer to be supplied with a synchronous digital signal, for example, a SDH, SONET or the like digital signal, having a predetermined synchronous clock rate and transporting ATM cells, comprising:

means having a data input and a data output for storing bytes of incoming ATM cells being supplied to said data input and bytes of the stored ATM cells being read out of the data output, each of said incoming ATM cells having a first predetermined fixed number of bytes;

means for increasing the number of bytes of the ATM cells being read out of said means for storing to form first internal ATM cells, each of said first internal ATM cells having a second predetermined fixed number of bytes larger than the first predetermined fixed number of bytes in the incoming ATM cells;

means for generating additional internal ATM cells, each of said additional internal ATM cells having said second predetermined fixed number of bytes; and means for combining said additional internal ATM cells with said first internal ATM cells so that a clock rate equal to the synchronous clock rate of the incoming synchronous digital signal may be used as a read clock for a data stream including said first internal ATM cells and said additional internal ATM cells being supplied as an output from said means for combining.

2. The invention as defined in claim 1 wherein said means for generating generates a number of additional internal ATM cells and said means for combining combines said number of generated additional internal ATM cells with said first internal ATM cells so that a total number of internal ATM cells including said first internal ATM cells plus said additional internal ATM cells is an integer number of internal ATM cells to be supplied as an output from said means for combining during a predetermined interval.

3. The invention as defined in claim 2 wherein said predetermined interval is 125 μ seconds and said integer number is 45.

4. The invention as defined in claim 2 wherein said means for increasing increases the number of bytes by one (1) to form said internal ATM cell.

5. The invention as defined in claim 4 wherein said one increased byte comprises a first nibble including four (4) bits and a second nibble including four (4) bits and said means for increasing includes means for inserting said first nibble at the beginning of each incoming ATM cell and said second nibble at the end of each incoming ATM cell.

6. The invention as defined in claim 5 wherein said first nibble includes at least two (2) type bits indicating whether said ATM cell in an internally generated cell, an incoming cell, an idle cell or not.

7. The invention as defined in claim 1 wherein said incoming clock rate is the STM-1 rate of 155.52 Mb/s.

* * * * *